No. 891,715. PATENTED JUNE 23, 1908.
S. A. MOSS.
COMBUSTION CHAMBER.
APPLICATION FILED APR. 4, 1906.

Witnesses:
Marcus L. Byng.
Helen Orford

Inventor,
Sanford A. Moss,
By Albert G. Davis
Atty.

UNITED STATES PATENT OFFICE.

SANFORD A. MOSS, OF LYNN, MASSACHUSETTS, ASSIGNOR TO GENERAL ELECTRIC COMPANY, A CORPORATION OF NEW YORK.

COMBUSTION-CHAMBER.

No. 891,715.

Specification of Letters Patent.

Patented June 23, 1908.

Original application filed December 31, 1904, Serial No. 239,089. Divided and this application filed April 4, 1906. Serial No. 309,742.

*To all whom it may concern:*

Be it known that I, SANFORD A. MOSS, a citizen of the United States, residing at Lynn, county of Essex, State of Massachusetts, have invented certain new and useful Improvements in Combustion-Chambers, of which the following is a specification.

The present invention relates to combustion chambers for gas turbines, and has for its object to improve their construction.

The present application is a division of my pending application Serial No. 239,089, filed Dec. 31, 1904, which division is made at the requirement of the United States Patent Office under the provisions of Rules 41 and 42.

Figure 1:
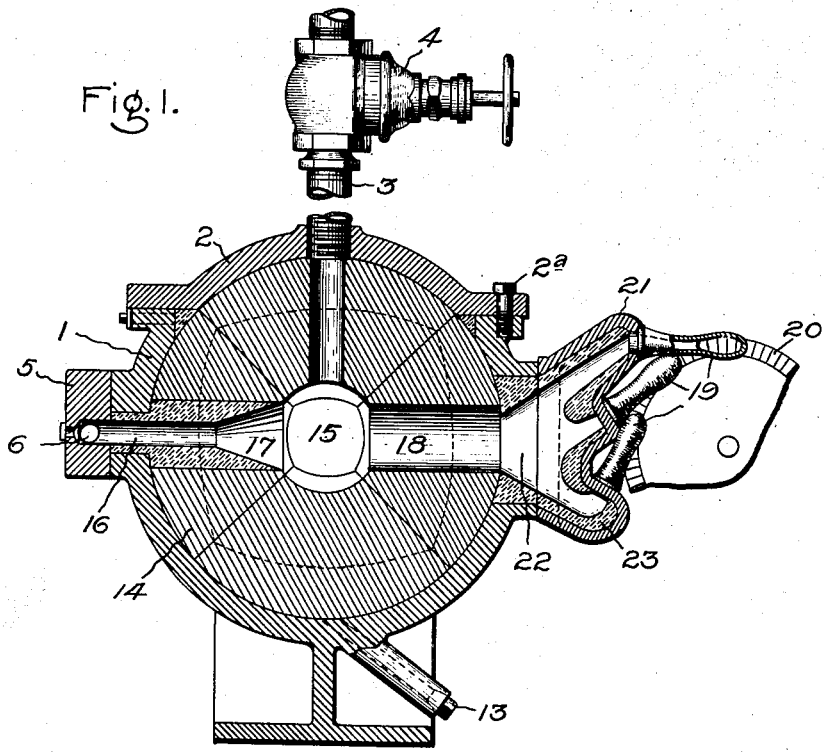
Figure 2:
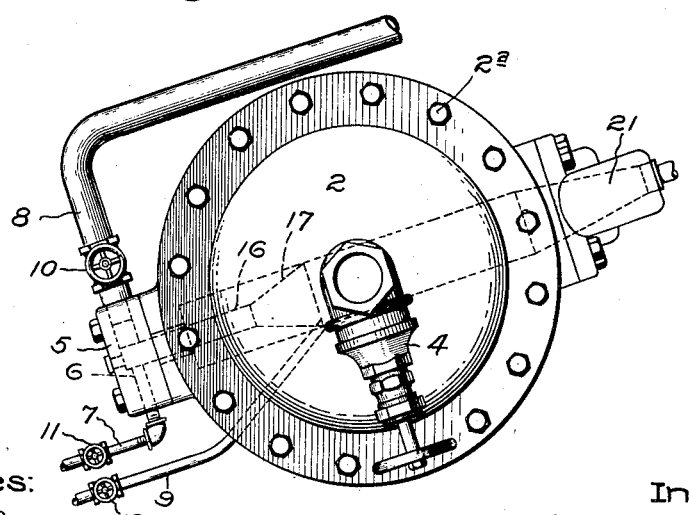

In the accompanying drawing, which illustrates one of the embodiments of my invention, Figure 1 is a transverse section of the chamber, and Fig. 2 is a plan view thereof.

The combustion chamber comprises a cast-iron casing 1, having a removable cover 2 that is retained in place by bolts 2ª or equivalent securing means. To the cover is secured a short normally closed pipe or conduit 3 having a valve 4. By opening the valve when the pressure is off of the chamber a lighted torch can be inserted from the end for the purpose of starting. When the apparatus is in operation the valve is shut. On the left-hand side of the casing is a plate 5 containing a passage 6 to which are connected a fuel-conveying pipe 7, and a compressed-air pipe 8. The pipe 9 admits water to the combustion chamber. Located in the compressed-air pipe and adjacent to the pipe is a butterfly or other throttling valve 10 for regulating the admission of compressed air to the combustion chamber. The valve 11 is employed to control the admission of oil to the chamber, and the valve 12 for controlling the admission of water. It is to be noted that the water pipe 9 enters the combustion chamber beyond the point where the mixture of fuel and air is formed, and in this way is prevented from interfering with the proper mixing. In some cases the water may, however, enter at the same point as the air and fuel. In order to drain off any liquid which may accumulate in the combustion chamber due to accident or otherwise, a passage is provided on the under side which is normally closed by the plug 13. The casing is lined with pieces of fire brick 14 to confine the heat and reduce radiation. These pieces are closely fitted one to the other and to the casing. By taking off the cover 2 the interior of the chamber can be exposed or a new lining inserted.

In the center of the chamber is a spherical opening 15 in which combustion takes place. Connected with this enlargement and discharging into it is a passage or conduit 16 which prevents back-firing and has an expanding nozzle 17 to reduce the velocity of the mixture. When the velocity of an elastic fluid is above a certain value, a diverging passage such as 17 will increase the velocity of the fluid, but when the velocity is below a certain value, as in the present case, the said passage will decrease the velocity of the fluid. In the latter case the action is similar to that of a non-compressible fluid flowing through an expanding passage. The velocity of the mixture flowing through the passage 16 is greater than the velocity of flame propagation so that the flame cannot travel back toward the source of fuel and air supply. The diverging passage 17 decreases the velocity of the mixture to a value permitting combustion to take place. The actual flame begins at the point within the passage 17, where the velocity of the mixture is just equal to the velocity of flame propagation. There is a body of unlighted gas preceding this point, and a body of lighted gas succeeding it. Extending from the central opening toward the turbine is a passage 18 which conveys the products of combustion mixed with steam or other cooling vapor to the nozzles 19. In the present illustration three of these nozzles are shown, but I may employ a greater or less number. The nozzles may be expanding or non-expanding in character, those shown being of the expanding type having a contracted and an expanding portion, the throat for each nozzle being formed between said portions. The nozzle or nozzles discharge the gases under high velocity against the buckets 20 on the turbine wheel. The nozzles are mounted on a common support 21 that is attached to or forms a part of the casing 1 of the combustion chamber. The interior of the nozzle support is provided with a chamber 22 that communicates with the passage 18.

By experiment I have found that only a small amount of water is necessary to keep the fire-brick lining from melting. In the particular arrangement of parts employed about twice as much water as fuel was introduced. This had the effect of preventing the fire-brick lining of the combustion chamber from melting, and the power of the turbine wheel was slightly increased. I do not wish however to be understood as limiting myself to using any definite proportion of fuel and water, since the conditions will vary with different installations. My tests up to the present time indicate that the use of too much or too little cooling fluid will cause a falling-off in the power developed by the turbine.

The nozzles in order to withstand the high temperatures may be provided with means for cooling them, such for example as is set forth in my application Serial No. 309,744, filed April 4, 1906.

It is important to protect the surfaces of the nozzle support as far as possible owing to the intense heat at this point. In order to do this I have provided a lining of heat-resisting material 23 which should be of sufficient thickness to prevent undue heating of the parts. The nozzles in the present illustration are not provided with heat-resisting linings or covers but such may be provided if desired.

After the gases pass through the buckets 20 on the turbine wheel they are collected in the wheel casing and pass through a conduit to a regenerator or other exhaust.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. A combustion chamber comprising casing, a lining therefor made of heat-resisting material, fuel and air admission pipes, a conduit receiving the mixture from the pipes, a diverging nozzle communicating with the conduit and receiving the mixture before it enters the chamber and is fired, the said nozzle reducing the velocity of the mixture, a second conduit receiving the products of combustion after the mixture is fired, and a means receiving said products from the second conduit and discharging them to an energy-absorbing device.

2. A combustion chamber comprising a casing, a lining therefor, a normally closed conduit communicating with the chamber inclosed by the lining through which a torch can be inserted for starting, a conduit receiving a combustible mixture, a nozzle which receives the mixture from the conduit which expands toward the chamber to decrease the velocity of the mixture, and a conduit for discharging the products of combustion from the chamber.

3. A combustion chamber comprising a casing, a lining therefor surrounding the walls of the chamber, a conduit for receiving the mixture for the chamber, an expanding nozzle which receives the mixture, decreases its velocity and discharges the same to the chamber, a support carried by the casing and provided with a chamber receiving the products of combustion, a heat-resisting lining for the support, and one or more nozzles carried by the support.

In witness whereof I have hereunto set my hand this thirty first day of March, 1906.

SANFORD A. MOSS.

Witnesses:
JOHN A. McMANUS, Jr.,
HENRY O. WESTENDARP.